R. THURY.
ELECTRICAL SUPPLY SYSTEM AT CONSTANT CURRENT STRENGTH AND VARYING VOLTAGE.
APPLICATION FILED MAR. 30, 1916.
1,280,587.
Patented Oct. 1, 1918.
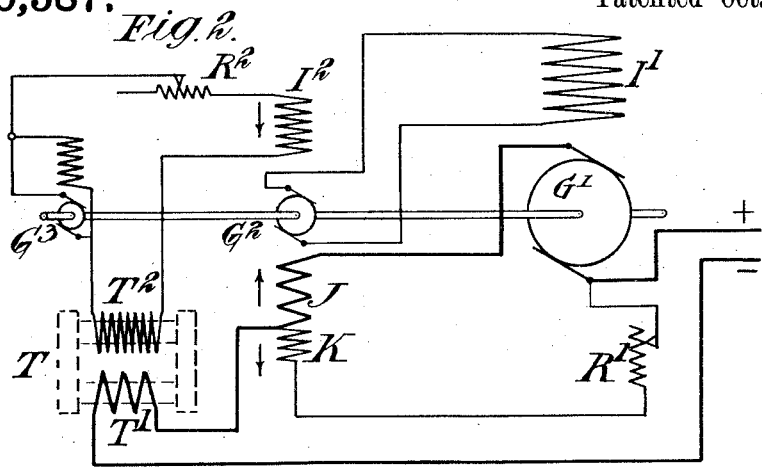
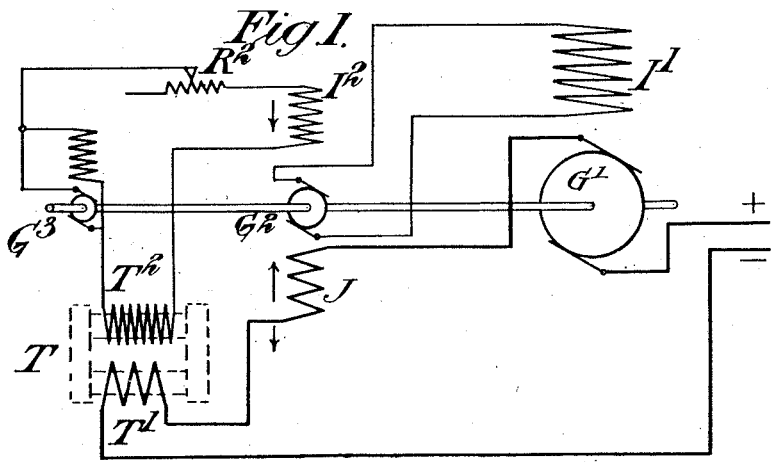
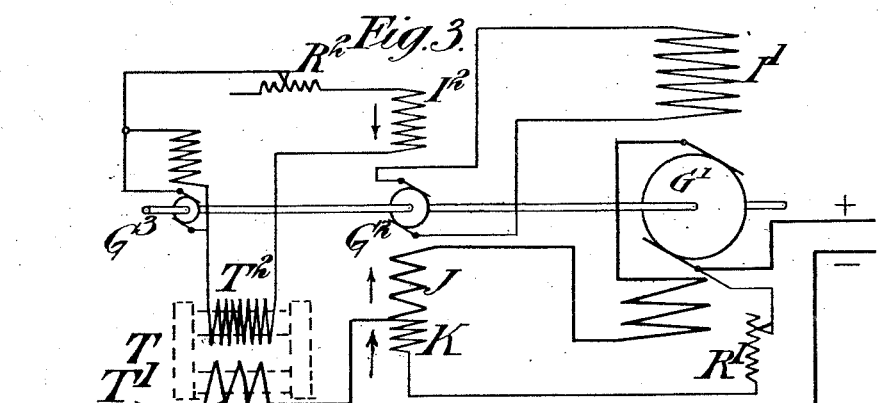

UNITED STATES PATENT OFFICE.

RENÉ THURY, OF GENEVA, SWITZERLAND, ASSIGNOR TO DICK KERR & COMPANY, LIMITED, OF LONDON, ENGLAND.

ELECTRICAL SUPPLY SYSTEM AT CONSTANT CURRENT STRENGTH AND VARYING VOLTAGE.

1,280,587.  Specification of Letters Patent.  Patented Oct. 1, 1918.

Application filed March 30, 1916. Serial No. 87,768.

*To all whom it may concern:*

Be it known that I, RENÉ THURY, a citizen of the Swiss Confederation, residing at Geneva, Switzerland, have invented certain new and useful Improvemenets in Electrical Supply Systems at Constant Current Strength and Varying Voltage, of which the following is a specification.

The invention relates to electrical supply systems of the kind employing a current of constant strength delivered at a voltage which varies with the load; the kind of system is commonly referred to as a series system and will hereinafter be referred to as such.

The object of the present invention is to provide such means for exciting a generator or a motor supplying or utilizing respectively such a system that better regulation and greater stability are obtained. One element of instability is found in the tendency to surging when the conditions of load are suddenly changed, the duration of the surging extending from the moment of introduction of the changed conditions to some later time when the system has settled down to these new conditions.

According to the present invention there is provided an exciter whose field is differentially excited by the line-current and by a current derived from a source of substantially constant voltage; the exciter may further be excited by a compounding whose effect depends upon the voltage obtaining across the terminals of the machine to be excited. The exciter may be employed for either a generator or a motor and this machine is hereinafter referred to as the main machine to distinguish it from the exciter.

There may also be provided, according to this invention, a stabilizing transformer whose primary circuit carries the line-current or a current proportional thereto, part or whole of the secondary voltage in the transformer being arranged to operate either in series with the voltage generated by the said exciter or in series with the said source of substantially constant voltage.

The main machine may be arranged to receive either a part only of its excitation or the whole of its excitation, from the exciter in the former case it receives the remainder of its excitation from the line-current.

A convenient form of this last said arrangement is one in which one-half of the excitation of the machine is derived from the line and the other half from the exciter in such a way that at full load the two halves operate to assist one another, at half load the exciter is idle and at no load the effect of the exciter is antagonistic to that due to the line.

In the accompanying drawings—

Figure 1 is a diagram of circuits showing a simple arrangement according to this invention;

Fig. 2 is a diagram similar to Fig. 1 of a modification embodying a compounding for the exciter, and Fig. 3 is another similar diagram showing yet a further modification in which the main machine receives part only of its excitation from the exciter.

Fig. 1 will be described as applied to a generator shown at $G_1$. This generator is excited by a winding $I_1$ that is fed from an exciter $G_2$. The exciter is differentially excited under the joint action of two windings, namely that shown at $I_2$ which receives current from a small constant potential machine $G_3$, and a winding J which is traversed by the line-current delivered by the main machine $G_1$. The three armatures $G_1$, $G_2$, $G_3$ are conveniently mounted on a single shaft. The constant potential machine $G_3$ is hereinafter referred to as the sub-exciter and this may, if desired, be replaced by any other source of constant potential, such, for example, as an accumulator. An adjusting rheostat is inserted at $R_2$ in the circuit of the winding $I_2$.

Dealing for the moment with the circuits of Fig. 1 above referred to, and neglecting the transformer T shown in the figure, the action is as follows:—Under normal conditions the preponderant effect of $I_2$ over that of J provides sufficient excitation to $G_2$ to cause the latter to deliver the required current to $I_1$. At no load the difference between $I_2$ and J is exceedingly small but as load comes on the line-current tends to drop, and since the effect of $I_2$ is constant, a diminution in the effect of J occasions an increase in the excitation of $I_1$. The excitation of the main machine $G_1$ therefore increases as the load rises as desired.

In order to obtain sensitiveness of action in the exciter $G_2$, the windings $I_2$ and J should each contain a very large number of ampere turns under normal conditions so that a small percentage of change in either will provided a relatively large actual change. Further, in order that the value of the change in the electro-motive force of $G_2$ should correspond closely with the change in the line-current the magnetic circuit of the exciter should be lightly saturated and further $G_2$ should be so designed that a moderate excitation of its field is sufficient to generate in it the electro-motive force requisite for the normal excitation of the main machine $G_1$.

As the load increases the line-current falls off slightly in strength but this drop exists in every non-compound dynamo and is usually corrected by an automatic or hand operated rheostat. In the arrangement shown in Fig. 1 this may be effected by means of the rheostat $R_2$.

Automatic compounding may be provided for by a winding K, such as is shown in Fig. 2. This winding is connected virtually across the brushes of the main machine, at least so as to receive a current proportional to the voltage obtaining across the terminals of that machine and is so connected as to oppose the winding J and assist the winding $I_2$ of the exciter. When more load is thrown on the line the potential at the terminals of the generator increases and the exciting current through the winding K is increased. This strengthens the exciter field and increases the current of the generator field $I_1$. This arrangement will readily be seen to be the equivalent of compounding ordinary continuous current machines. A regulating rheostat $R_1$ may be provided in the circuit of the winding K to enable adjustment of the compounding effect so that the latter may correspond with the permissible drop in the value of the line-current. For structural reasons the field windings of the exciter are arranged on a magnetic circuit common to them all.

In these conditions, mutual induction is very strong and in consequence retards regulation in a manner which is prejudicial to stable working. Surging in the line is thus rendered likely, although one object of this invention is to obtain increased stability of regulation and the entire exclusion of surging or periods of oscillation in the line-current.

The transformer T is provided to cope with this difficulty. As shown diagrammatically, it carries two windings $T_1$ and $T_2$ arranged to provide an electromotive force equal to, or even greater than, that generated in the winding $I_2$ by the mutual induction in it from J. The electro-motive force induced in $I_2$ by momentary changes in the line-current traversing the winding J is thus neutralized. This is effected by connecting the windings $T_1$ and $T_2$ in such a way that their magneto-motive forces assist one another on the transformer core, and by connecting the secondary winding $T_2$ in series with the winding $I_2$ on the exciter. The transformer is so designed as to the windings $T_1$ and $T_2$ and the reluctance of its magnetic circuit that the secondary electro-motive force in the winding $T_2$, either is substantially equal to the inductive effect of J upon $I_2$, or is sufficiently in excess of this last effect to enhance the rapidity of the changes in the field of $G_1$. The co-efficient of self-induction of the winding $I_1$ is necessarily large and may in this way be to a great degree overcome.

The employment of a suitably designed transformer in the manner just described has the effect of giving stability to the regulation and of increasing the rapidity of regulation. In spite of this the co-efficient of self-induction of the field winding $I_1$ on the generator may, under certain conditions, prevent a sufficiently rapid regulation unless it is opposed by a sufficiently great opposing electro-motive force. If the exciter $G_2$ has a sufficiently lightly saturated magnetic field, this difficulty will be met and the terminal voltage will be able to rise sufficiently to follow closely very rapid changes in the conditions of load.

The arrangements shown in Figs. 1 and 2 have been above described as applied to a generator, but they may be applied without any change to obtain regulation of speed on a motor intended to run at constant speed and connected to a series system of supply. It is only necessary that the exciter $G_2$ and the sub-exciter $G_3$, or even the sub-exciter $G_3$ alone, should be driven by the motor; the latter is indicated in the case of motors by the machine $G_1$. When operating in connection with a motor, as illustrated in Fig. 3, the field winding J provided by the series circuit predominates over the effect of $I_2$ and the compounding K assists J instead of opposing it since the generated electromotive force in the main machine $G_1$ is in opposition to the line-current by reason simply of the fact that the machine is operating as a motor. When more load is put on the motor, the series system of supply increases in voltage to carry the load, causing an increase of current through the coil K. This strengthens the field winding J to give the increased torque for carrying the increased load. Since the coil K assists the coil J, it, of course, opposes the coil $I_2$. Regulation then takes place just as with a generator.

If the motor slows up by reason of an increase in the load upon it, the corresponding reduction in speed of the sub-exciter $G_3$ causes an increase in the difference between the excitation due to $I_2$ and J so that the field of the motor $G_1$ is increased. The available torque is also in its turn increased and the speed tends to rise. The converse occurs if the load on the motor decreases or is removed. The speed increases slightly but at the same time the excitation in $I_2$ increases so that the final result is a reduction of the field and of the back electro-motive force of the motor. If one attempts to increase further the speed of the motor by driving it from some other source of power this machine is transformed immediately into a generator and opposes a torque resisting the acceleration.

The compounding K assists in the regulation by augmenting or reducing the torque and diminishes the drop of speed as the load rises.

In case the load should suddenly increase for the motor, $G_1$ would then slow down. As a result, K would be weakened, since the counter electromotive force of $G_1$ is reduced. In turn this weakens the excitation of $G_2$ and therefore the excitation of $G_1$ but for the action of $G_3$. The sub-exciter $G_3$ and the coil K are so designed that $G_3$ now furnishes less current to $I_2$; that is, $I_2$ is reduced more than K is from these conditions. The net result is that the excitation of $G_2$ is really increased. This causes the magneto motive force of $I_1$ to be increased and the torque of $G_1$ correspondingly increased. As the motor $G_1$ comes up to speed, the coil K is furnished with a correspondingly increased voltage to take care of the necessary increase in excitation.

The speed may be kept rigorously constant under all conditions of load by employing a speed regulator operating upon one or another of the exciting windings $I_2$ or J or even upon the winding $I_1$, this regulator serving to correct the small variations arising from heating of the windings and from the characteristics of the exciters and of the motor.

If a curve be drawn connecting the available torque with the speed, for the case in which no speed regulator is employed, it will be seen that the curve rises rapidly from zero, corresponding with the starting up of the motor, reaches a maximum corresponding with the point of saturation of the field, and then descends very rapidly to zero on reaching its maximum speed. The torque at starting is exceedingly small because the exciter $G_2$ is stationary. If the latter is separately driven the starting torque may be a maximum. One may, however, avoid driving $G_2$ sufficiently if one excites the motor $G_1$ partly by means of line-current and partly from the exciter $G_2$. The proportion provided by the line-current may be, for example, one half of the total excitation and this will give a starting torque slightly in excess of 50% of the maximum torque. The out-puts of $G_2$ and $G_3$ can in this case be reduced to 50% of the value they must have if none of the excitation is provided by the line-current, but the general operation remains otherwise unaltered. The exciter $G_2$ is to operate in such a manner that in the transition from no load on the motor to full load, it shall reverse its polarity through a range of voltage extending about equally on both sides of zero. In order to effect this, matters have to be so arranged that the relation between $I_2$ and J becomes reversed during the transition. J is constant and therefore $I_2$ must first overpower, and then be subordinate to J. At no load, therefore, $I_2$ preponderates over J, which is now inappreciably assisted by K; $G_3$ is running at maximum speed. As the load comes on, and the motor slows up, the excitation of $I_2$ diminishes, and J, though constant itself, becomes more powerfully assisted by K until at about half load these three factors combine to produce no excitation of $G_2$. As the load further increases, and the speed of $G_3$ further drops, $I_2$ produces an effect subordinate to J and moreover K assists J more powerfully, so that the polarity of $G_2$ now becomes reversed. As load further increases the voltage of $G_2$ increases in magnitude until, when the full load condition has been reached, its voltage is approximately the same as it was at no load, but of the opposite sign, so that the winding $I_1$ now assists the series winding on the motor $G_1$ instead of nearly neutralizing it as it did at no load.

The transformer T is not necessary to motor operation unless motor-generator operation of the machine is in contemplation. At the same time the employment of the transformer T always has a stabilizing effect on the regulation of the line-current and in this view is desirable.

Dynamos regulated by the method provided by the present invention may be of the well-known type with commutating poles. By employing automatic regulators in addition to the arrangements hereinbefore described the most advantageous degree of saturation of the fields from the point of view of cheapness of construction may be chosen. The rheostat $R_2$ is useful in facilitating the starting up, the maintenance of the current at its normal value, and the shutting down of the generators; in the case of a motor it enables adjustment of speed to be made; this rheostat may otherwise be inserted in the field circuit of the said exciter $G_3$ and in general facilitates the operation of switching in and switching out both the generators and motors.

What I claim as my invention and desire to secure by Letters Patent is:—

1. The combination of a dynamo-electric machine constructed and arranged for series operation and an exciter therefor whose field is provided with a compounding coil whose exciting effect is determined by the voltage existing across the terminals of the machine to be excited by the exciter, an exciting coil energized at a substantially constant voltage, and a counted-exciting coil energized in proportion of the line-current traversing the armature of the machine to be excited substantially as set forth.

2. The combination of a dynamo-electric machine constructed and arranged for series operation and excited partly by a current proportional to the line-current traversing its armature and an exciter for supplying part of the exciting current provided with an exciting coil energized at a substantially constant voltage and with a counter-exciting coil energized in proportion to the line-current traversing the armature of the machine to be excited substantially as set forth.

3. The combination of a dynamo-electric machine constructed and arranged for series operation and excited partly by a current proportional to the line-current traversing the armature of the aforesaid machine and an exciter for supplying part of the exciting current in such a manner that at full load on the said machine the exciter supplies one half of the excitation and the line-current supplies the other half of the excitation the said exciter being provided with an exciting coil energized at a substantially constant voltage and with a counter-exciting coil energized in proportion to the line-current traversing the armature of the machine to be excited, substantially as set forth.

4. The combination of a dynamo-electric machine constructed and arranged for series operation, an exciter therefor mounted in operative driving connection therewith, a sub-exciter mounted in operative driving connection with the said exciter, an exciting coil on the exciter energized by said sub-exciter, a counter-exciting coil on the exciter energized in proportion to the line-current traversing the armature of said dynamo-electric machine, and means whereby this last said machine is excited by said exciter substantially as set forth.

5. The combination of a motor constructed and arranged for series operation, a field-coil on said motor to be excited by the line-current fed to its armature, an exciter therefor mounted in operative driving connection therewith, a sub-exciter mounted in operative driving connection with said exciter, an exciting coil on the exciter energized by said sub-exciter, a counter-exciting coil on the exciter energized in proportion to the line-current fed to the said motor armature, and a field coil on the said motor energized by said exciter, substantially as set forth.

In testimony whereof I have signed my name to this specification in the presence of two subscribing witnesses.

RENÉ THURY.

Witnesses:
 ELMER SCHEIDER,
 Dr. ROD DE WURTEMBERGER.